J. W. TALBOT.
QUOIN.
APPLICATION FILED JUNE 23, 1909.
948,000.
Patented Feb. 1, 1910.
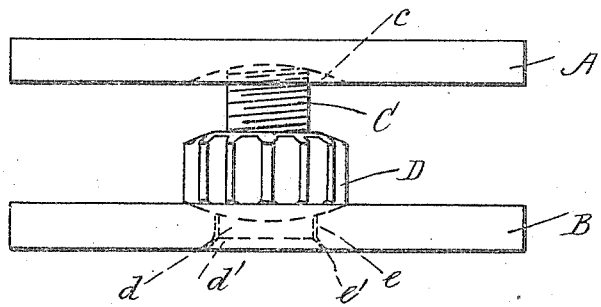
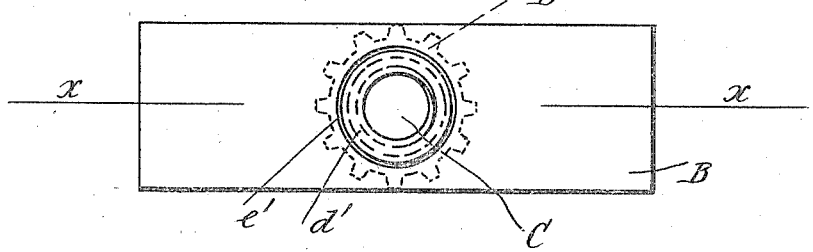
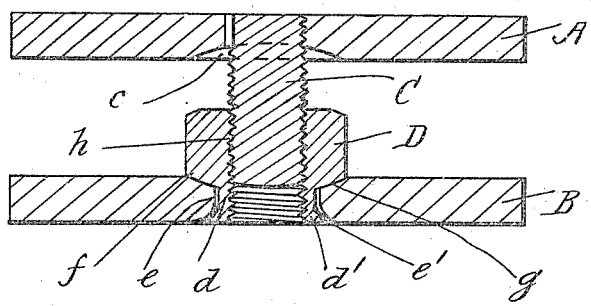
Witnesses
Geo. C. Fulton
W. Allen
Inventor
John W. Talbot.
By Herbert W. Jenner.
Attorney

UNITED STATES PATENT OFFICE.

JOHN W. TALBOT, OF CHICAGO, ILLINOIS, ASSIGNOR, BY DIRECT AND MESNE ASSIGNMENTS, OF ONE-HALF TO FRANK I. HALL AND ONE-HALF TO HARRY H. HALL, BOTH OF MIDDLETOWN, CONNECTICUT.

QUOIN.

948,000.  Specification of Letters Patent.  Patented Feb. 1, 1910.

Application filed June 23, 1909. Serial No. 503,791.

*To all whom it may concern:*

Be it known that I, JOHN W. TALBOT, a citizen of the United States, residing at Chicago, in the county of Cook and State of Illinois, have invented certain new and useful Improvements in Quoins; and I do hereby declare the following to be a full, clear, and exact description of the invention, such as will enable others skilled in the art to which it appertains to make and use the same.

This invention relates to quoins for the use of printers; and it consists in the novel construction and combination of the parts hereinafter fully described and claimed.

In the drawings, Figure 1 is a plan view of the quoin. Fig. 2 is a front view of the quoin. Fig. 3 is a sectional plan view, taken on the line $x$—$x$ in Fig. 2.

A and B are are two plates arranged substantially parallel with each other. A screwthreaded stem C is rigidly secured at one end to the plate A, and a concave recess $c$ is formed in the plate A where the stem C projects so that there may be no small ragged edge or projection at this point.

D is a toothed wheel provided at one end with a tubular extension or sleeve $d$ which is journaled in a bearing $e$ in the plate B. The end of the extension $d$ is riveted over to form a flange $d'$, and the plate B has a recess $e'$ to receive the said flange. One side $f$ of the wheel D is convex, and the plate B has a concave recess $g$ to fit against this wheel. This permits the plate B to have a slight oscillatory movement on the part $d$ so that the plates of the quoin will fit neatly and accurately into spaces which do not have exactly parallel sides. The wheel is provided internally with a screwthreaded portion $h$ which engages with the screwthreaded stem C.

The wheel D is revolved by the fingers, or by any approved wrench, to adjust the relative positions of the plates A and B, as required.

What I claim is:

1. In a quoin, the combination, with two plates, one of which has a concave recess in each face and a bearing between the recesses, of a screwthreaded stem secured to the other plate, and a wheel provided with a screwthreaded portion which engages with the said stem, said wheel having also a convex face and a projecting sleeve having a retaining flange, said sleeve being journaled in the said bearing and the said face and flange being arranged in the said recesses and permitting the plate to oscillate on the sleeve.

2. In a quoin, the combination, with two plates, one of which has a concave recess in each face and a bearing between the recesses, of a screwthreaded stem secured to the other plate, and a wheel provided with a screwthreaded portion which engages with the said stem, said wheel having also a convex face and a projecting sleeve having a retaining flange, said sleeve being journaled in the said bearing and the said face and flange being arranged in the said recesses and permitting the plate to oscillate on the sleeve, and the other plate being provided with a recess in one face around the projecting portion of the said stem.

In testimony whereof I have affixed my signature in the presence of two witnesses.

JOHN W. TALBOT.

Witnesses:
  M. E. BLACK,
  H. T. CHACE, Jr.